US012799265B2

(12) United States Patent
Latorre Martinez et al.

(10) Patent No.: US 12,799,265 B2
(45) Date of Patent: Nov. 17, 2026

(54) COMPOSITION COMPRISING EPOXY-FUNCTIONAL OXAZOLIDINONE

(71) Applicant: Covestro Deutschland AG, Leverkusen (DE)

(72) Inventors: Irene Cristina Latorre Martinez, Leverkusen (DE); Yvonne Reimann, Frechen (DE); Jan Weikard, Leverkusen (DE); Florian Golling, Dortmund (DE); Laura Woods, Düsseldorf (DE); Christoph Guertler, Cologne (DE); Aurel Wolf, Wülfrath (DE); Kai Laemmerhold, Odenthal (DE); Stefan Westhues, Leverkusen (DE); Sohajl Movahhed, Cologne (DE); Walter Leitner, Aachen (DE); Charlotte Over, Aachen (DE); Chicco Manzuna Sapu, Berlin (DE); Mathias Glassner, Wiesbaden (DE)

(73) Assignee: Covestro Deutschland AG, Leverkusen (DE)

( * ) Notice: Subject to any disclaimer, the term of this patent is extended or adjusted under 35 U.S.C. 154(b) by 648 days.

(21) Appl. No.: 18/266,398

(22) PCT Filed: Dec. 6, 2021

(86) PCT No.: PCT/EP2021/084306
§ 371 (c)(1),
(2) Date: Jun. 9, 2023

(87) PCT Pub. No.: WO2022/122606
PCT Pub. Date: Jun. 16, 2022

(65) Prior Publication Data

US 2024/0076439 A1 Mar. 7, 2024

(30) Foreign Application Priority Data

Dec. 10, 2020 (EP) .................................... 20213135
Aug. 12, 2021 (EP) .................................... 21190994

(51) Int. Cl.
*C08G 59/04* (2006.01)

(52) U.S. Cl.
CPC ......... *C08G 59/04* (2013.01); *C08G 2150/00* (2013.01)

(58) Field of Classification Search
CPC .................................................. C08G 59/4028
See application file for complete search history.

(56) References Cited

U.S. PATENT DOCUMENTS

| | | | |
|---|---|---|---|
| 3,183,112 | A | 5/1965 | Gemassmer |
| 3,645,979 | A | 2/1972 | Liebsch et al. |
| 3,996,223 | A | 12/1976 | Gupta et al. |
| 4,255,569 | A | 3/1981 | Muller et al. |
| 4,518,761 | A | 5/1985 | Richter et al. |
| 4,837,359 | A | 6/1989 | Woynar et al. |
| 4,960,848 | A | 10/1990 | Scholl et al. |
| 4,994,541 | A | 2/1991 | Dell et al. |
| 5,064,960 | A | 11/1991 | Pedain et al. |
| 5,076,958 | A | 12/1991 | Pedain et al. |
| 6,632,915 | B1 | 10/2003 | Schwarte et al. |
| 8,211,504 | B2 | 7/2012 | Wegner et al. |
| 2010/0227090 | A1 | 9/2010 | Liao et al. |
| 2014/0121299 | A1 | 5/2014 | Feng et al. |
| 2018/0273684 | A1 | 9/2018 | Wu et al. |

FOREIGN PATENT DOCUMENTS

| | | | |
|---|---|---|---|
| CN | 101717571 | A | 6/2010 |
| CN | 101842401 | A | 9/2010 |
| CN | 103881050 | A | 6/2014 |
| CN | 105218780 | A | 1/2016 |
| DE | 870400 | C | 3/1953 |
| DE | 953012 | C | 11/1956 |
| DE | 1090196 | B | 10/1960 |
| DE | 1954093 | A1 | 6/1970 |
| DE | 1670667 | A1 | 12/1970 |
| DE | 1670666 | A1 | 7/1971 |
| DE | 2414413 | A1 | 10/1975 |
| DE | 2452532 | A1 | 5/1976 |
| DE | 2641380 | A1 | 3/1978 |
| DE | 3700209 | A1 | 7/1988 |
| DE | 3900053 | A1 | 7/1990 |
| DE | 3928503 | A1 | 3/1991 |
| DE | 19914898 | A1 | 10/2000 |
| DE | 19948004 | A1 | 7/2001 |
| DE | 10043405 | C1 | 6/2002 |
| EP | 0078991 | A2 | 5/1983 |
| EP | 0113233 | A1 | 7/1984 |
| EP | 0113575 | A1 | 7/1984 |
| EP | 0296450 | A1 | 12/1988 |
| EP | 0336205 | A2 | 10/1989 |
| EP | 0339396 | A1 | 11/1989 |
| EP | 0416338 | A2 | 3/1991 |

(Continued)

OTHER PUBLICATIONS

Machine translation of EP0296450. (Year: 1988).*
Dyen et al., 2-Oxazolidones, Chem. Rev., 1967, 67, pp. 197-246.

*Primary Examiner* — Wenwen Cai
(74) *Attorney, Agent, or Firm* — The Webb Law Firm

(57) ABSTRACT

The present invention relates to composition at least including (A) at least one epoxy-group terminated polyoxazolidinone, derived from at least one polyisocyanate compound and at least one aliphatic polyepoxide compound, (B) at least one compound having at least one group that is reactive towards terminal epoxy-groups, and (C) at least one solvent. The molar ratio of the epoxy groups of the polyepoxide compound to the isocyanate groups of the polyisocyanate compound is 50:1 to 2.4:1. The at least one epoxy-group terminated polyoxazolidinone is present in an amount of 50 to 95% by weight, in respect of the solid content of the composition. The sum of all components in respect of the solid content of the composition adds up to 100% by weight and where the solid content of the composition is at least 35% by weight.

10 Claims, No Drawings

(56) References Cited

FOREIGN PATENT DOCUMENTS

| | | | |
|---|---|---|---|
| EP | 0546399 | A2 | 6/1993 |
| EP | 0696606 | A1 | 2/1996 |
| EP | 0751163 | A1 | 1/1997 |
| EP | 0798299 | A1 | 10/1997 |
| EP | 0807623 | A2 | 11/1997 |
| EP | 1378529 | A1 | 1/2004 |
| EP | 1378530 | A1 | 1/2004 |
| EP | 2174967 | A1 | 4/2010 |
| EP | 3216814 | A1 | 9/2017 |
| EP | 3647335 | A1 | 5/2020 |
| GB | 1145952 | A | 3/1969 |
| GB | 1244416 | A | 9/1971 |
| JP | 5659828 | A | 5/1981 |
| JP | 63260915 | A | 10/1988 |
| WO | 9015089 | A1 | 12/1990 |

* cited by examiner

COMPOSITION COMPRISING EPOXY-FUNCTIONAL OXAZOLIDINONE

CROSS-REFERENCE TO RELATED APPLICATIONS

This application is the United States national phase of International Application No. PCT/EP2021/084306 filed Dec. 6, 2021, and claims priority to European Patent Application Nos. 20213135.5 filed Dec. 10, 2020 and 21190994.0 filed Aug. 12, 2021, the disclosures of which are hereby incorporated by reference in their entireties.

BACKGROUND OF THE INVENTION

Field of the Invention

The present invention relates to a composition at least comprising (A) at least one epoxy-group terminated polyoxazolidinone, derived from at least one polyisocyanate compound and at least one aliphatic polyepoxide compound, (B) at least one compound having at least one group that is reactive towards terminal epoxy-groups, and (C) at least one solvent, wherein the molar ratio of the epoxy groups of the polyepoxide compound to the isocyanate groups of the polyisocyanate compound is 50:1 to 2.4:1, wherein the at least one epoxy-group terminated polyoxazolidinone is present in an amount of 50 to 95% by weight, in respect of the solid content of the composition, wherein the sum of all components in respect of the solid content of the composition adds up to 100% by weight and wherein the solid content of the composition is at least 35% by weight, to a process for the preparation of said composition comprising at least the step of mixing components (A), (B) and (C), to the use of this composition as a coating, preferably as an anti-corrosive coating, a protective coating, can coating or coil coating, to a coating formulation comprising at least such a composition, to a process for coating of a substrate comprising the step of application of said coating formulation onto the substrate and to a coated substrate comprising such a coating formulation.

Description of Related Art

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, *Chem. Rev.,* 67, 197, 1967). Due to these disadvantages there was the need for alternative methods for the production of oxazolidinones especially for application of oxazolidinones as structural motif in polymer applications.

EP 0 113 575 A1 discloses a powder coating composition comprising an epoxy-terminated polyoxazolidinone, prepared by reacting a diepoxide with a diisocyanate, wherein the ratio of epoxide equivalents to isocyanate equivalents ranges from 10:1 to 1.1:1. The resulting polyoxazolidinones have an epoxy equivalent weight from 250 to 4000.

EP 3 216 814 A1 discloses an isocyanate-modified epoxy resin and its use as adhesive or coating having high heat resistance and low dielectric properties. The isocyanate-modified epoxy resin according to said document comprises aromatic moieties in the epoxy part of the polymer.

WO 1990/015089 A1 discloses epoxy-terminated polyoxazolidinones, a process for their preparation and electrical laminates comprising them. The epoxides that are used according to this document are selected from aromatic compounds like diglycidyl ethers of bisphenol A and/or tetrabromobisphenol.

EP 0 113 233 A1 discloses thermosetting coating compositions containing a polyepoxide and a curing agent. Again, aromatic polyepoxides which are based on bisphenol A and derivatives thereof are used.

SUMMARY OF THE INVENTION

Objective of the present invention was therefore to provide a coating formulation comprising epoxy terminated polyoxazolidinones which advantageously fulfill the demands of coating and which are comparable with the known coating formulations. A particular objective is to provide a corresponding formulation having a solid content of at least 35% by weight, in order to improve the characteristics of the coating which is obtained therefrom.

Surprisingly, it has been found that these objectives can be solved by a composition at least comprising (A) at least one epoxy-group terminated polyoxazolidinone, derived from at least one polyisocyanate compound and at least one aliphatic polyepoxide compound, (B) at least one compound having at least one group that is reactive towards terminal epoxy-groups, and (C) at least one solvent, wherein the molar ratio of the epoxy groups of the polyepoxide compound to the isocyanate groups of the polyisocyanate compound is 50:1 to 2.4:1, wherein the at least one epoxy-group terminated polyoxazolidinone is present in an amount of 50 to 95% by weight, in respect of the solid content of the composition, wherein the sum of all components in respect of the solid content of the composition adds up to 100% by weight and wherein the solid content of the composition is at least 35% by weight.

These objectives can further be solved by a process for the preparation of said composition comprising at least the step of mixing components (A), (B) and (C), by the composition obtainable by this process, by the use of this composition as a coating formulation, preferably as an anti-corrosive coating formulation, a protective coating formulation, in particular as a can coating formulation or as a coil coating formulation, by a coating formulation comprising at least this composition, by a process for coating of a substrate comprising the step of application of this coating formulation onto the substrate, and by a correspondingly coated substrate.

DESCRIPTION OF THE INVENTION

The present invention will be explained in detail in the following:

As used herein, the term “polyoxazolidinone” is meant to denote compounds containing at least two oxazolidinone groups in the molecule. The term “epoxy-group terminated” polyoxazolidinone is related to polyoxazolidinone compounds, wherein the molar ratio of the epoxy groups of the polyepoxide compound to the isocyanate groups of the polyisocyanate compound is 50:1 to 2.4:1, resulting in no terminal isocyanate groups being present within the polyoxazolidinone compound used according to the present invention.

The composition according to the present invention comprises at least components (A), (B) and (C), which are explained in detail in the following.

Component (A):

The composition according to the present invention comprises at least one epoxy-group terminated polyoxazolidinone, derived from at least one polyisocyanate compound and at least one aliphatic polyepoxide compound, in an amount of 50 to 95% by weight, in respect of the solid content of the composition, as component (A).

at least one epoxy-group terminated polyoxazolidinone which is used according to the present invention is derived from at least one polyisocyanate compound and at least one aliphatic polyepoxide compound.

As used herein, the term "polyisocyanate compound" is meant to denote compounds having two or more isocyanate groups.

In an embodiment of the method according to the invention, the polyisocyanate compound is an aliphatic linear, aliphatic branched, cycloaliphatic, araliphatic or aromatic polyisocyanate compound, preferable an aromatic and/or araliphatic polyisocyanate compound.

As used herein, the term "aliphatic linear polyisocyanate compound" is meant to denote compounds having two or more isocyanate groups and merely aliphatic linear moieties.

As used herein, the term "aliphatic branched polyisocyanate compound" is meant to denote compounds having two or more isocyanate groups and aliphatic branched moieties.

As used herein, the term "cycloaliphatic polyisocyanate compound" is meant to denote compounds having two or more isocyanate groups and cycloaliphatic moieties.

As used herein, the term "araliphatic polyisocyanate compound" is meant to denote compounds having two or more isocyanate groups and araliphatic moieties.

As used herein, the term "aromatic polyisocyanate compound" is meant to denote compounds having two or more isocyanate groups and aromatic moieties.

In a more preferred embodiment of the method according to the invention the polyisocyanate compound is an aromatic and/or araliphatic polyisocyanate compound.

The polyisocyanate compound and its preparation are in general known to the skilled artisan, for example by phosgenation in the liquid or gas phase or by a phosgene-free route, for example by thermal urethane cleavage.

In an embodiment of the method according to the invention, the polyisocyanate compound is at least one compound selected from the group consisting of polyisocyanates having preferably a molecular weight of 140 to 600 g/mol having linear aliphatically, branched aliphatically, cycloaliphatically, araliphatically and/or aromatically bonded isocyanate groups, examples being 1,4-diisocyanatobutane, 1,5-diisocyanatopentane (pentamethylene diisocyanate, PDI), 1,6-diisocyanatohexane (hexamethylene diisocyanate, HDI), 2-methyl-1,5-diisocyanatopentane, 1,5-diisocyanato-2,2-dimethylpentane, 2,2,4- or 2,4,4-trimethyl-1,6-diisocyanatohexane, 1,8-diisocyanatooctane, 1,10-diisocyanatodecane, 1,12-diisocyanatododecane, 1,3- and 1,4-diisocyanatocyclohexane, 1,3- and 1,4-bis (isocyanatomethyl)cyclohexane, 1-isocyanato-3,3,5-trimethyl-5-isocyanatomethylcyclohexane (isophorone diisocyanate, IPDI), 2,4'- and 4,4'-diisocyanatodicyclohexylmethane (H12-MDI), 4,4'-diisocyanato-2,2-dicyclohexyl propane, 1-isocyanato-1-methyl-4(3)isocyanatomethylcyclohexane, bis(isocyanatomethyl)norbornane, or any polyisocyanates having uretdione, isocyanurate, allophanate, biuret, iminooxadiazinedione and/or oxadiazinetrione structure, prepared by modification of simple aliphatic linear and/or aliphatic branched and/or cycloaliphatic diisocyanates, for example those of the type mentioned above, as described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299 or by mixtures of at least two such polyisocyanates, and 1,3- and 1,4-bis(isocyanatomethyl)benzene (xylylene diisocyanate, XDI), 1,3- and 1,4-bis(2-isocyanatopropan-2-yl)benzene (tetramethylxylylene diisocyanate, TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-2,4,6-trimethlybenzene, 1,3-bis (isocyanatomethyl)-4,5-dimethylbenzene, 1,4-bis (isocyanatomethyl)-2,5-dimethylbenzene, 1,4-bis (isocyanatomethyl)-2,3,5,6-tetramethylbenzene, 1,3-bis (isocyanatomethyl)-5-tert-butylbenzene, 1,3-bis (isocyanatomethyl)-4-chlorobenzene, 1,3-bis (isocyanatomethyl)-4,5-dichlorobenzene, 1,3-bis (isocyanatomethyl)-2,4,5,6-tetrachlorobenzene, 1,4-bis (isocyanatomethyl)-2,3,5,6-tetrachlorobenzene, 1,4-bis (isocyanatomethyl)-2,3,5,6-tetrabromobenzene, 1,4-bis(2-isocyanatoethyl)benzene and 1,4-bis(isocyanatomethyl) naphthalene, 1,2-, 1,3- and 1,4-diisocyanatobenzene (phenylene diisocyanate), 2,4- and 2,6-diisocyanatotoluene (toluene diisocyanate, TDI), 2,3,5,6-tetramethyl-1,4-diisocyanatobenzene, the isomeric diethylphenylene diisocyanates, diisopropylphenylene diisocyanates, diisododecylphenylene diisocyanates and biphenyl diisocyanates, 3,3'-dimethoxybiphenyl-4,4'-diisocyanate, 2,2'-, 2,4'- and 4,4'-diisocyanatodiphenylmethane (MDI), 3,3'-dimethyl diphenylmethane-4,4'-diisocyanate, 4,4'-diisocyanatodiphenylethane, 1,5-diisocyanatonaphthalene (NDI), diphenylether diisocyanate, ethylene glycol diphenylether diisocyanate, diethylene glycol diphenylether diisocyanate, 1,3-propylene glycol diphenylether diisocyanate, benzophenone diisocyanate, triisocyanatobenzene, 2,4,6-triisocyanatotoluene, trimethylbenzene triisocyanate, diphenylmethane-2,4,4'-triisocyanate, 3-methyldiphenylmethane-4,6,4'-triisocyanate, the isomeric naphthalene triisocyanates and methylnaphthalene diisocyanates, triphenylmethane triisocyanate, 2,4-diisocyanato-1-[(5-isocyanato-2-methylphenyl)methyl]benzene, 4-methyl-diphenylmethane-3,5,2',4',6'-pentaisocyanate, and also the polynuclear homologues of diisocyanatodiphenylmethane known as "polymer-MDI", and also the polyisocyanates having urethane and/or isocyanurate structures obtainable from monomeric 2,4- and/or 2,6-TDI by reaction with polyols and/or oligomerization, preferably trimerization, which are obtainable by any known methods, described for example in DE-A 870 400, DE-A 953 012, DE-A 1 090 196, EP-A 0 546 399, CN 105218780, CN 103881050, CN 101717571, U.S. Pat. No. 3,183,112, EP-A 0 416 338, EP-A 0 751 163, EP-A 1 378 529, EP-A 1 378 530, EP-A 2 174 967, JP 63260915 or JP 56059828 or are mixtures of at least two such polyisocyanates, and also those polyisocyanate compounds bearing both aromatic and aliphatic linear or branched isocyanate groups, for example the mixed trimers or allophanates of 2,4- and/or 2,6-TDI with HDI described in DE-A 1 670 667, EP-A 0 078 991, EP-A 0 696 606 and EP-A 0 807 623.

According to the present invention, a mixture of two or more of the aforementioned polyisocyanate compounds can also be used.

Particularly preferred, the at least one polyisocyanate compound is at least one compound selected from the group consisting of 2,2'-, 2,4'- and 4,4'-diisocyanatodiphenylmethane (MDI), the polynuclear homologues of diisocyanatodiphenylmethane, known as "polymer-MDI", 2,4- and 2,6-diisocyanatotoluene (toluene diisocyanate, TDI), 1,3- and 1,4-bis(isocyanatomethyl)benzene (xylylene diisocyanate, XDI), 1,3- and 1,4-bis(2-isocyanatopropan-2-yl)benzene (tetramethylxylylene diisocyanate, TMXDI), 3,3'-dimethyl diphenylmethane-4,4'-diisocyanate, 4,4'-diisocyanatodiphenylethane, 1,5-diisocyanatonaphthalene (NDI) and mixtures thereof.

The at least one epoxy-group terminated polyoxazolidinone which is used according to the present invention is further derived from at least one aliphatic polyepoxide compound.

As used herein, the term "polyepoxide compound" is meant to denote compounds having two or more epoxide groups According to the present invention, at least one aliphatic polyepoxide compound is used. As used herein, the term "aliphatic polyepoxide compound" is meant to denote compounds having two or more epoxide groups and contains only aliphatic linear or branched and/or cycloaliphatic moieties.

In a preferred embodiment of the invention, the at least one aliphatic polyepoxide compound is at least one compound selected from the group consisting of neopentyl glycol diglycidyl ether, hydrogenated bisphenol A diglycidyl ether, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, glycerol triglycidyl ether, polyglycerol polyglycidyl ether, polyglycidyl ether of ethoxylated trimethylolpropane, poly(tetramethylene-oxid) diglycidyl ether, pentaeritrol polyglycidyl ether, vinylcyclohexene diepoxide, the diepoxides of double unsaturated fatty acid C1 to C18 alkyl esters, polyepoxides of double unsaturated ethoxylated fatty alcohols, Aliphatic di- or polydiglycidyl ether, derived via epoxidation of di- or polyfunctional alcohols with aliphatic linear, aliphatic branched, or cycloaliphatic moieties consisting of 2 to 40 carbon atoms, for example ethanediol diglycicyl ether, propanediol diglycidyl ether, 1,4-butanediol diglycidyl ether, 1,6-hexanediol diglycidyl ether, octanediol diglycidyl ether, trimethylolpropane polyglycidyl ether, glycerol polyethylene triglycidyl ether, 2-ethyl hexyl diglycidyl ether, isosorbide diglycidyl ether.

In a more preferred embodiment of the invention, the at least one aliphatic polyepoxide compound is at least one compound selected from the group consisting of hydrogenated bisphenol A diglycidyl ether, polyethylene glycol diglycidyl ether, polypropylene glycol diglycidyl ether, glycerol triglycidyl ether, polyglycidyl ether of ethoxylated trimethylolpropane, poly(tetramethylene-oxid) diglycidyl ether, pentaeritrol polyglycidyl ether, the diepoxides of double unsaturated fatty acid C1 to C18 alkyl esters, aliphatic di- or polydiglycidyl ether, derived via epoxidation of di- or polyfunctional alcohols with aliphatic linear, aliphatic branched, or cycloaliphatic moieties consisting of 2-40 carbon atoms, for example ethanediol diglycicyl ether, 1,4-butanediol diglycidyl ether, 1,6-hexanediol diglycidyl ether, trimethylolpropane polyglycidyl ether, glycerol polyethylene triglycidyl ether, 2-ethyl hexyl diglycidyl ether, isosorbide diglycidyl ether.

Most preferred the at least one aliphatic polyepoxide compound is at least one compound selected from the group consisting of ethanediol diglycidyl ether, butanediol diglycidyl ether, hexane diol diglycidyl ether, trimethylopropane triglycidyl ether.

A mixture of two or more of the aforementioned aliphatic polyepoxide compounds can also be used.

Component (A) of the composition according to the present invention is obtained by the reaction of at least one polyisocyanate compound and at least one aliphatic polyepoxide compound, both as outlined above.

In a preferred embodiment of the invention component (A) is the product of at least one araliphatic polyisocyanate compound and at least one aliphatic polyepoxide compound.

In a further preferred embodiment of the invention component (A) is the product of at least one aromatic polyisocyanate compound and at least one aliphatic polyepoxide compound.

In general, the reaction between the at least one polyisocyanate compound and the at least one aliphatic polyepoxide compound can be conducted by any methods known to the skilled artisan.

In a preferred embodiment of the invention, the molar ratio of epoxy groups of the at least one aliphatic polyepoxide compound to the isocyanate groups of the at least one polyisocyanate compound is 50:1 to 2.5:1, particularly preferably 25:1 to 2.5:1, more preferably 10:1 to 2.5:1, further preferred 7:1 to 2.6:1, more preferred 6:1 to 2.6:1, even more preferred 5:1 to 2.6:1.

A preferred process for the preparation of component (A) comprises the steps:

i) Mixing the at least one polyisocyanate compound, the at least one polyepoxide compound and at least one catalyst forming a mixture (i);
ii) Copolymerizing the mixture (i).

An alternative process comprises the steps:

iii) Mixing the at least one polyepoxide compound and at least a part of at least one catalyst forming a mixture (iii);
iv) Addition of the at least one polyisocyanate compound to the mixture (iii) at copolymerization conditions.

A further alternative process comprises the steps:

v) Mixing the at least one polyisocyanate compound and at least a part of at least one the catalyst forming a mixture (v);
vi) Addition of at least one polyepoxide compound to the mixture (v) at copolymerization conditions.

Suitable conditions for the copolymerization process are for example a reaction temperature of 130 to 280° C., preferably 140 to 240° C., more preferred 155 to 210° C., most preferred 165 to 195° C. If temperatures below 130° C. are set, the reaction is generally very slow. At temperatures above 280° C., the amount of undesirable secondary products increases considerably.

The catalyst is in general at least one compound selected from the group consisting LiCl, LiBr, LiI, $MgCl_2$, $MgBr_2$, $MgI_2$, $SmI_3$, $Ph_4SbBr$, $Ph_4SbCl$, $Ph_4PBr$, $Ph_4PCl$, $Ph_3(C_6H_4—OCH_3)PBr$, $Ph_3(C_6H_4—OCH_3)PCl$, $Ph_3(C_6H_4F)PCl$, and $Ph_3(C_6H_4F)PBr$, preferred LiCl, LiBr, LiI and $MgCl_2$.

The catalyst is in general present in a molar amount of 0.001 to 2.0 mol-%, preferably in an amount of 0.005 to 1.5 mol-%, more preferred 0.01 to 1.0 mol-%, based on the at least one polyepoxide compound.

The catalyst or a solution of the catalyst in a solvent is added in one or several portions so that it is homogeneously dissolved. Suitable solvents are for example organic solvents such as linear or branched alkanes or mixtures of alkanes, mono or polysubstituted halogenated aromatic solvents or halogenated alkane solvents, for example, 1,2-dichlorobenzene, linear or cyclic ester, or polar aprotic solvents such as cyclic carbonate, such as ethylencarbonate or propylencarbonate, N-methylpyrrolidone (NMP), sulfolane, tetramethylurea, N,N'-dimethylethylenurea or mixtures of the above mentioned solvents and/or with other solvents.

The copolymerization can be done in presence or in absence of a solvent.

According to the present invention, the epoxy-group terminated polyoxazolidinone (A) has preferably an epoxy equivalent weights (EEW) of from 100 to 5000 g/eq, preferable of from 150 to 3000 g/eq, more preferred of from 200 to 1500 g/eq, wherein the epoxy equivalent weight was measured with a Metrohm 888 Titrando system. The epoxy sample (0.4-0.7 g) was dissolved in glacial acetic acid (50 mL) in a 250 mL beaker. Subsequently, a solution of tetrabutylammonium bromide (TBAB) in glacial acetic acid (0.2 mol·L$^{-1}$, 25 mL) was added to the dissolved epoxy sample. The solution was titrated with a solution of perchloric acid in glacial acetic acid (0.1 mol·L$^{-1}$) until after the equivalent point.

The at least one epoxy-group terminated polyoxazolidinone (A) which is used in the composition according to the present invention is present in the composition in an amount of 50 to 95% by weight, preferably 65 to 95% by weight, particularly preferably 70 to 90% by weight, in each case in respect of the solid content of the composition. The sum of all components in respect of the solid content of the composition according to the present invention adds up to 100% by weight in each case.

The epoxy-group terminated polyoxazolidinone in general has an oxazolidinone weight content of 5 to 50% by weight, preferably 7 to 45% by weight, particularly preferably 10 to 40% by weight. This content has been calculated from the amounts of at least one polyisocyanate and at least one epoxide compound that have been used for the preparation of the epoxy-group terminated polyoxazolidinone, wherein the oxazolidinone group has a molecular weight of 86.07 g/mol. These calculated values are based on essentially 100% conversion. Conversion and selectivity of the reaction towards oxazolidinone are measured and confirmed using analytical methods known to the skilled artisan such as IR (infrared spectroscopy) and/or 13C-NMR spectroscopy.

The present invention therefore preferably relates to the composition according to the present invention, wherein the epoxy-group terminated polyoxazolidinone in general has an oxazolidinone weight content of to 50% by weight, preferably 7 to 45% by weight, particularly preferably 10 to 40% by weight.

The composition according to the present invention comprises at least one compound having at least one functional group that is reactive towards terminal epoxy-groups as component (B).

In general, component (B) present in the composition according to the present invention can be any compound which comprises at least one functional group which is reactive towards terminal epoxy-groups of component (A).

Component (B) which is present in the composition according to the present invention is a hardener, i.e. a curing agent or crosslinker, or curing agent blend. Generally, any hardener known in the art which is appropriate for curing epoxy resins may be used. The hardener of choice may depend on the application requirements.

Preferably, component (B) is preferably selected form the group consisting of dicyandiamides, substituted guanidines, phenolic compounds, amines, in particular aliphatic amines, benzoxazines, anhydrides, amido amines, polyamides, polyamines, polyesters, polyisocyanates, polymercaptans, urea formaldehyde, melamine formaldehyde resins and mixtures thereof.

For example, in one embodiment, component (B) is at least one anhydride or a mixture comprising at least one anhydride group. Examples of corresponding preferred components (B) are selected from the group consisting of phthalic acid anhydride and derivatives, nadic acid anhydride and derivatives, trimellitic acid anhydride and derivatives, pyromellitic acid anhydride and derivatives, benzophenonetetracarboxylic acid anhydride and derivatives, dodecenylsuccinic acid anhydride and derivatives, poly(ethyloctadecanedioic acid)anhydride and derivatives, and mixtures thereof.

In one embodiment, component (B) is at least one amine Preferred amines are selected from the group consisting of aliphatic amines, in particular ethanolamine, ethylenediamine, diethylenetriamine (DETA), triethyleneaminetetramine (TETA), dicyandiamide or amine-terminated polyols, aromatic amines, in particular 1-(o-tolyl)-biguanide, methylenedianiline (MDA), toluenediamine (TDA), diethyltoluenediamine (DETDA) or diaminodiphenylsulfone (DADS) and mixtures thereof Mercaptans, in particular mercaptan-terminated polysulfide polymers or mixtures thereof, can also be used as component (B).

A trimellitic acid anhydride based system is most preferably used as component (B).

A further preferred group of compounds used as component (B) in the composition according to the present invention are phenol formaldehyde compounds, including, but not limited to, reaction products of aldehydes with phenols. Examples of aldehydes include, but are not limited to, formaldehyde and acetaldehyde. Various phenols can be used such as, but not limited to, phenol, cresol, p-phenylphenol, p-tert-butylphenol, p-tert-amylphenol, cyclopentylphenol, cresylic acid, bisphenol-A, bisphenol-F and combinations thereof. Examples of commercially available phenol formaldehyde crosslinkers such as Aradur 949-2, available from HUNTSMANN, and PHENODUR™ PR 612, available from CYTEC Industries, among others. Also acid functional phenols could be used in making phenol formaldehyde resins. Corresponding components (B) can be unetherified or etherified with alcohols or polyols.

According to a particularly preferred embodiment of the present invention, the at least one compound comprising at least one functional group that is reactive towards terminal epoxy-groups in component (B) is selected from the group consisting anhydrides, phenol formaldehyde compounds, amines, benzoxazines, amido amines, polyamides, polyamines and mixtures thereof.

The at least one compound having at least one functional group that is reactive towards terminal epoxy-groups (component (B)) is present in the composition in an amount of 5 to 50% by weight, preferably 5 to 35% by weight, particularly preferably 10 to 30% by weight, in each case in respect of the solid content of the composition.

According to a preferred embodiment of the present invention, the weight ratio of epoxy groups of the component (A) to the functional groups that are reactive towards terminal epoxy-groups in component (B) is from 50:50 to 95:5; preferably from 60:40 to 90:10 more preferably from 65:35 to 85:15.

The composition according to the present invention comprises at least one solvent as component (C).

The at least one solvent present in the composition according to the present invention can in general be selected from any organic solvents and mixtures of organic solvents that are known to the skilled artisan.

Preferably the at least one solvent is at least one organic solvent selected from the group consisting of aromatic hydrocarbons, for example toluene, xylene or Solvesso 100, ketones, for example methyl ethyl ketone (MEK), methyl isobutyl ketone (MIBK), methyl propyl ketone, isophorone ethyl amyl ketone or methyl n-amyl ketone, alcohols, for example butanol, n-hexanol, amyl alcohol, 2-ethylhexanol or cyclohexanol, ether alcohols and their acetate esters, for example methoxyethanol, ethoxyethanol, butoxyethanol, hexoxyethanol, methoxypropanol, methoxyethyl acetate or ethoxyethyl acetate, methoxypropylacetate (MPA), cyclic ethers, for example tetrahydrofurane (THF), ureas, for example dimethyl propylene urea (DMPU) and mixtures thereof.

The at least one solvent (component (C)) is present in the composition in an amount of 5 to 75% by weight, preferably 15 to 70% by weight, particularly preferably 30 to 65% by weight, in each case in respect of the sum of components (A), (B) and (C) of the composition.

Optionally and beside components (A), (B) and (C), the composition according to the present invention can comprise at least one additive as component (D). An example of such an additive is phosphoric acid.

This at least one additive can be added in an amount of 0.1% to 5%, preferably 0.1% to 2%, most preferably 0.5% to 1.5% with respect to the sum of components (A), (B), (C) and (D).

The present invention further relates to the process for the preparation of a composition according to the present invention comprising at least the step of mixing components (A), (B) and (C).

In general, any methods that are known to the skilled artisan can be used in order to prepare the composition according to the present invention. In particular, Preferably, component (A) is added to a suitable reactor, for example a glass bottle, and diluted with solvent component (C). This solution is then preferably added the corresponding amount of component (B) which is preferably also dissolved in solvent (component (C)). Optionally additives (component (D)) can be added afterwards.

The present invention further relates to the composition obtainable by the process according to the present invention.

The present invention further relates to the use of the composition according to the present invention as a coating formulation.

The mentioned coating formulations are, in general known to the skilled artisan. Depending on the specific use of the mentioned coating formulations, specific further components beside the well described components (A), (B) and (C) are optionally present in the specific formulations.

Therefore, beside components (A), (B) and (C) present in the composition according to the present invention, the coating formulation according to the present invention can also comprise at least one additive. In general, this at least one additive can be selected from any additives that are known to the skilled artisan in the technical field of coating formulations.

Preferably, the at least additive is selected from the group consisting of residue-free or essentially residue-free thermally decomposable salts, binders which are preferably curable physically, thermally and/or with actinic radiation, crosslinking agents, organic solvents other than the at least one solvent mentioned as component (C), thermally curable reactive thinners, reactive diluents curable with actinic radiation, coloring and/or effect pigments, transparent pigments, fillers, molecularly dispersible dyes, nanoparticles, light stabilizers, antioxidants, deaerators, emulsifiers, slip additives, polymerization inhibitors, radical polymerization initiators, thermolabile free radical initiators, adhesion promoters, leveling agents, film-forming aids, for example thickeners and shear thinning sag control agents (SCA), flame retardants, corrosion inhibitors, flow aids, desiccants, biocides, matting agents, organic pigments, inorganic pigments, for example zinc oxide, carbon black, or titanium dioxide anti-corrosion pigments, fillers, for example calcium sulfate, barium sulfate, silicates, for example talc, bentonite, kaolin, silicas, oxides, for example aluminum hydroxide, magnesium hydroxide, nanoparticles, organic fillers, for example textile fibers, cellulose fibers, polyethylene fibers, wood flour, titanium dioxide, carbon black, Iron oxide, zinc phosphate, lead silicate, radical scavenger, organic corrosion inhibitors, crosslinking catalysts, for example inorganic and organic salts and complexes of tin, lead, antimony, bismuth, iron or manganese, preferably organic salts and complexes of bismuth and tin, in particular bismuth lactate, ethylhexanoate or dimethylolpropionate, dibutyltin oxide or dibutyltin dilaurate, polymerization inhibitors, defoamers, emulsifiers, for example non-ionic emulsifiers such as alkoxylated alkanols and polyols, phenols and alkylphenols or anionic emulsifiers such as alkali salts or ammonium salts of alkane carboxylic acids, alkane sulfonic acids, and sulfonic acids of alkoxylated alkanols and polyols, phenols and alkylphenols, wetting agents, for example siloxanes, fluorine-containing compounds, carboxylic acid half-esters, phosphoric acid esters, polyacrylic acids and their copolymers or polyurethanes, adhesion promoter, flow aids, film-forming aids, for example cellulose derivatives, flame retardants, low molecular weight, oligomeric and high molecular weight reactive diluents which can participate in the thermal crosslinking, for example polyols such as tricyclodecanedimethanol, dendrimeric polyols, hyperbranched polyesters, polyols based on metathesis oligomers or branched alkanes with more than eight carbon atoms in the molecule, anticratering agent, water-miscible or dispersible organic solvents, rheology-controlling additives, cross-linked polymeric microparticles, inorganic layered silicates, preferably smectites, in particular montmorillonites and hectorites, such as aluminum-magnesium silicates, sodium-magnesium and sodium-magnesium-fluorine-lithium layered silicates of the montmorillonite type or inorganic layered silicates such as aluminum-magnesium-silicates, sodium-magnesium and montmorillonite type sodium magnesium fluorine lithium layered silicates, silicas such as aerosils, synthetic polymers with ionic and/or associative groups, for example polyvinyl alcohol, poly(meth)acrylamide, poly(meth)acrylic acid, polyvinyl pyrrolidone, styrene-maleic anhydride or ethylene-maleic anhydride copolymers and their derivatives or hydrophobically modified polyacrylates, associative polyurethane-based thickeners, catalysts, for example a hydrophobic sulfonic acid catalyst based on dinonylnaphthalene disulfonic acid, preferably supplied as a solution in isobutanol (Nacure 155), alcohols, for example butanol or hexanol, stabilizers, for example phosphoric acid, and mixtures thereof. Suitable additives of the type mentioned above are, for example, known from German patent application DE 199 48 004 A1, German patent application DE 199 14 898 A1, German patent DE 100 43 405 C1.

The coating composition according to the present invention comprises the above-mentioned additives or mixtures thereof in general in amounts that are usual in the technical field. Preferably, the mentioned additives are used in an amount of 0.1 to 5% by weight, based on the total amount of the coating formulation.

The present invention further relates to a coating formulation comprising at least a composition according to the present invention. Preferably, the present invention relates to the preferred formulations as mentioned above which comprise the above-mentioned preferred components. In addition, the optional additives as mentioned also apply to the coating formulation according to the present invention.

The present invention further relates to the process for coating of a substrate comprising the step of application of a coating formulation according to the present invention onto the substrate.

Examples of suitable substrates are selected form the group consisting of beverage cans, food cans, aerosol containers such as those for non-food products, e.g. hair spray, hair dye, or color spray lacquers, drums, kegs, pails, decorative tins, open trays, tubes, bottles, monoblocs, caps, lids such as thin aluminum foil based lids for yogurt and butter containers, or crown corks, closures for glass jars and bottles such as roll-on closures, vacuum closures, pilfer-proof closures, easy peel lids for can closures, and easy open end or conventional ends for cans, among others. Cans, to which the coating compositions disclosed herein may be applied, can be 2-piece cans or 3-piece cans.

Beverage cans include, but are not limited to, beer cans, carbonated soft drink cans, energy drink cans, isotonic drink cans, water cans, juice cans, tea cans, coffee cans, milk cans.

Food cans, include, but are not limited to, vegetable cans, fruit cans, meat cans, soup cans, ready meal cans, fish cans, edible oil cans, sauce cans. Such cans may have various shapes, for example, such can may have a cylindrical shape, cubical, spherical, semi-spherical, bottle shape, elongated cubical shape, shallow or tall shape, round or rectangular shape or other suitable shape, or a combination thereof.

The substrate itself preferably comprises a metal, e.g., a metal substrate. Examples of the metal include, but are not limited to, aluminum and aluminum alloys, steel, electrolytic tinplate cold rolled low carbon mild steel, electrolytic chromium/chromium oxide coated cold rolled low carbon mild steel, and other pre-treated steels. Pretreatment may include, but is not limited to, treatment with phosphoric acid, zirconium phosphate, chromium phosphate, and the like as well as silanes for reasons such as primary corrosion protection and improved adhesion. The metal substrate may comprise a sheet, strip or a coil.

The substrate may be formed via stamping, drawing, redrawing, wall ironing, bending, beading, embossing, debossing, flanging, necking, stretching, blow-stretching and/or other suitable conventional methods. Such methods are known to those having ordinary skill in the art.

According to the present invention, the coating compositions may, for example, be applied to the substrate, e.g. metal sheet or metal foil, then the coating may be cured, and then the coated substrate may be formed into a coated article, e.g., a container device or a coated closure device.

According to a further embodiment of the present invention, the substrate may be formed into a container, e.g., a container device or a closure device, and then the container device or the closure device can be coated with the coating compositions and then the coating may be cured to form the coated article.

In each embodiment the coating formulation may be applied by various methods, for example via brushing, roller coating, spray coating, for example air-atomized spray, air spray, airless spray, high volume low pressure spray powder coating, dip coating, electrodeposition coating, for example electrostatic bell application, all printing methods like e.g. screen printing, letter-press, gravure, off-set, flexographic, pad, relief, intaglio, thermal and digital printing, wash coating, flow coating, flood coating, draw down coating, knife or blade coating, slot dye and/or curtain coating. Either manual or automatic methods can be used.

The curing step is preferably conducted at a temperature of 20 to 250° C., preferably from 100 to 250° C., particularly preferred 110 to 210° C. The curing step is preferably conducted for a time of 7 to 40 min., particularly preferred 10 to 20 min. An ordinary person skilled in the art will select the curing temperature and/or curing time according to the chemistry of component (B).

The coating, i.e. the coating composition applied to the substrate, may have a thickness in the range of 0.01 to 2000 μm. All individual values and subranges from 0.01 to 2000 μm are included herein and disclosed herein, for example, the coating may have a thickness from a lower limit of 0.01 μm, 0.05 μm, or 1 μm, to an upper limit of 2000 μm, 1500 μm or 1000 μm. For example, the coating may have a thickness 0.01 to 2000 μm, 0.05 to 1500 μm or in the alternative, 0.1 to 1000 μm. According to a preferred embodiment, the coating may have a thickness of 5 to 500 μm.

The present invention further relates to a coated substrate comprising a coating formulation according to the present invention.

EXAMPLES

The present invention will be further described with reference to the following examples without wishing to be limited by them.

The following chemicals and compounds have been used:

Diisocyanate Compounds

- MDI: Methylene diphenyl diisocyanate (Desmodur® VP.PU 1806), >99% by weight, Covestro AG, Germany.
- pMDI: Desmodur® 44V10L, mixture of methylene diphenyl iisocyanate (MDI) with isomers and homologues of higher functionality, NCO content 30.5 to 32.5% by weight.

Epoxide Compounds

- Araldite® DY-D/CH: butanediol diglycidyl ether (BDDE), EEW 118 to 125 g/eq; obtained from HUNTSMAN Advanced Materials (Deutschland) GmbH, Germany. Since Araldite® DY-D/CH provides a significant amount of compounds which are not the ideal structure, but for example BDDE, the effective molar amount of epoxy groups was calculated on the basis of the experimentally determined EEW of 121 g/eq.
- ipox RD 20: trimethylolpropanpolyglycidylether, EEW 140 to 150 g/eq, was obtained from ipox chemicals GmbH, Germany. Since ipox RD 20 provides a significant amount of compounds which are not the ideal structure, but for example Trimethylolpropantriyglycidylether, the effective molar amount of epoxy groups was calculated on the basis of the experimentally determined EEW of 149 g/eq.
- BDDE: 1,4-butandioldiglycidylether: obtained from Merck in purity >=95%
- TMPGE: trimethyolpropantriglycidyl ether: obtained from Merck in technical grade.
- Aradur 949-2: butylated Bisphenol A Resole Resin, was obtained from HUNTSMAN Advanced Materials (Deutschland) GmbH, Germany. Epoxy curing agent. Etherified resole based on bisphenol-A supplied in n-butanol. Epoxy equivalent weight 1500-2000.

Aradur 3380-1 CH: modified anhydride hardener from HUNTSMAN Advanced Materials (Deutschland) GmbH, Germany. Low molecular acid hardener for epoxy based can and also powder coatings. Acid number 500-540 mg KOH/g, anhydride content 3.00-4.00 eq/kg.

Catalyst

LiCl Lithium chloride, purity >99% by weight, was obtained from Sigma Aldrich, Germany LiBr Lithium bromide, purity >99% by weight, was obtained from Sigma Aldrich, Germany.

$Ph_4PBr$ Tetraphenylphosphonium bromide, purity 97% by weight, was obtained from Sigma Aldrich, Germany.

$Ph_4PCl$ Tetraphenylphosphonium chloride, purity 98%, was obtained from Sigma Aldrich, Germany Solvents MPA 1-methoxypropyl-2-acetate, anhydrous, was obtained from Azelis, St. Augustin.

toluene From Azelis, St. Augustin.

n-butanol Obtained from Kraemer and Martin, St. Augustin.

Methoxy-propanol Obtained from Kraemer

Phosphoric acid Purity 85%, obtained from Riedel-de Haen.

DMPU 1,3-Dimethyl-3,4,5,6-tetrahydro-2(1H)-pyrimidinone, purity >99% by weight, anhydrous, was obtained from Sigma Aldrich, Germany.

CPC Cyclic propylene carbonate, purity >99% by weight, anhydrous, was obtained from Sigma-Aldrich, Germany.

Addition Protocols

Batch protocol: All components are weighted into a glass flask, which is put into an oil bath pre-heated to 175° C. and stirred immediately.

Semi-batch protocol: The diepoxide or a mixture of diepoxides is provided in a glass flask and heated to 175° C. under argon. The catalyst or a solution of the catalyst in a solvent is added in one portion. The diisocyanate compound or a mixture of diisocyanate compounds is slowly added to the reactor while the mixture is continuously stirred at 175° C.

Methods of Characterization:

IR-Spectroscopy

IR analyses were performed on a Bruker ALPHA-P IR spectrometer equipped with a diamond probe head. The software OPUS 6.5 was used for data treatment. A background spectrum was recorded against ambient air. Thereafter, a small sample of the polyoxazolidinone prepolymer (2 mg) was applied to the diamond probe and the IR spectrum recorded averaging over 24 spectra obtained in the range of 4000 to 400 $cm^{-1}$ with a resolution of 4 $cm^{-1}$.

GPC

GPC measurements were performed at 40° C. in tetrahydrofuran (THF, flow rate of 1.0 $mL\cdot min^{-1}$). The column set consisted of 3 consecutive columns (PSS SDV, 5 μm, 8×50 mm precolumn, 2 PSS SDV linear S, 5 μm, 8×300 mm). Samples (concentration 2 to 3 $g\cdot L^{-1}$, injection volume 20 μL) were injected employing an Agilent technologies 1200 series auto sampler. An RID detector of the Agilent 1200 series was used to follow the concentration at the exit of the column. Raw data were processed using the PSS WinGPC Unity software package. Polystyrene of known molecular weight was used as reference to calculate the molecular weight distribution (PSS ReadyCal Kit in an area of 266 to 66.000 Da was used). The number average molecular weight measured by GPC is denominated as Mn (GPC) in the examples.

Viscosity

The viscosity values were determined via a cone/plate rheometer from Anton Paar MCR 302. A shear rate 63 $l\cdot min^{-1}$ was used to determine the viscosity of the products. The viscosity is given in the unit mPa·s. (Following the procedure according to DIN EN ISO 3219/A.3:1994). If not indicated otherwise all measurements were performed at 25° C.

Gardner Color Index

The Gardner color index was determined by using a Lico 620 from Hach. Therefore, a sample of the product mixture was diluted with N,N-dimethyl acetamide (50:50) to lower the viscosity. The sample solution was filled into a cuvette which was subsequently analyzed following the DIN EN ISO 1557:1997.

Epoxy Equivalent Weight (EEW)

The epoxy equivalent weight was measured using a Metrohm 888 Titrando system. The epoxy sample (0.4 to 0.7 g) was dissolved in glacial acetic acid (50 mL) in a 250 mL beaker. Subsequently, a solution of tetrabutlyammonium bromide (TBAB) in glacial acetic acid (0.2 $mol\cdot L^{-1}$, 25 mL) was added to the dissolved epoxy sample. The solution was titrated with a solution of perchloric acid in glacial acetic acid (0.1 $mol\cdot L^{-1}$) until after the equivalent point.

Pendulum Damping

The pendulum damping according to König was determined to DIN EN ISO 1522:2007-04 on glass plates.

Solvent Resistance

To test the coatings for solvent resistance, small amounts of each of the solvents xylene, 1-methoxypropyl-2-acetate, ethyl acetate and acetone were placed in test tubes and provided with a cottonwool pad at the opening, thus forming a solvent-saturated atmosphere within the test tubes. The test tubes were subsequently brought with the cotton pad onto the surface of the coating, where they remained for 5 minutes. After the solvent had been wiped off, the film was examined for destruction/softening/loss of adhesion and rated (0: no change, 5: film completely dissolved). The evaluations reported are those for the four solvents in the order in each case of xylene (X), 1-methoxypropyl-2-acetate (MPA), ethyl acetate (EA) and acetone (A) in the form of four successive digits. These were determined according to DIN EN ISO 4628-1:2016-07

The solvent resistance test is done additionally by counting the number of double rubs, i.e. forwards and back, necessary to remove the coating down to the metal. Rubbing is carried out with a piece of cotton wool-soaked in methyl ethyl ketone. The result is reported as a number of double rubs from 0 to 100, wherein numbers above 100 are all reported as >100.

Chemical Resistance

To test the coatings towards chemical resistance towards water, acid and base different methods were employed. 10% by weight solutions of NaOH and sulfuric acid were deposited on the coatings and covered with a small glass vial. A cotton pad was immersed in water and then placed on top of a coating which was then covered with a small glass vial. The solutions remained on the coatings for 24 h. After this time, fresh water was used to remove the chemical from the coatings. The panel was then dried with paper and then the panel were examined firstly for visible changes and then by using a fingernail to scratch the surface. The observations were rated as 0: no change, 1: small ring observed, 5: film completely dissolved without fingernail scratch. These were determined according to DIN EN ISO 4628-1:2016-07

Stacking Strength

To determine the stacking strength of the coating square meter panels (10 cm×10 cm) of tinplate was used as a substrate. Filter paper circles from Schleicher and Schuell (55 mm, 'black ribbon') were placed on top of the coatings, and a second plate facing downwards was placed on top. Above the coated plates a 10 cm metal plate went on top of these followed by a 5 kg weight. This set up was positioned in the oven for 16 h at 50° C. After completion of the test, the panels were removed from the oven and separated. The results were reported based on a visible test as to how many fibers were observed on the coated panels. The panels are rated from 0 to 5 where 0 has no visible effect to the coating surface and 5 means the filter paper was not easy to remove from the coating.

Adhesion ("Gitterschnitt")

The adhesion was examined by making a grid (9×9) of 1 mm square cross cuts on the panel. The panel was then impacted from the non-coated side with an Erickson ball from a 30 inch height. The grid was then covered in clear cellotape and then removed, twice. Following this, the panels were immersed for a few seconds in a solution of 10% copper sulfate and 10% HCl. This allowed for better observation of the changes to the coating as copper color indicated removal of the coating. The results were reported from 0 to 5, 0 indicating no effect to the coating and 5 meaning the coating was completely removed from the panel.

Wedge Bend

The wedge bend test is conducted to determine the flexibility, this is done after ageing of the panels for at least 1 day at room temperature. A cooled panel (100 mm by 40 mm) is bent over a 5 mm cylindrical mandrel. The folded panel thus produced is then impacted (9 N) in a device (the wedgebend tester, Erichsen model 471) to form a wedge-shaped contour, flat at one end and 6 mm diameter at the other end. This test piece is then immersed in a 10% by weight copper sulfate in 10% by weight aqueous hydrochloric acid solution for a few seconds. This stains any cracks that occur in the coating. The width in centimeters of the cracked surface is measured starting from the flat side, hence the larger the number the greater the destruction to the coating.

Sterilization Test

The sterilization test is carried out on by first stretching the panels into a curved shape of approximately 300° C. The coated panels are then placed into a sterilizer at a temperature of 121° C. for 1 hour in the presence of water. The plates are then quickly cooled to 50 to 60° C. in 15 minutes and removed from the machine. The panels are then paper dried and immediately evaluated for bubbles, white colour, and removal of the coating from the panel. The surface is also scratched with the fingernail to determine the damage caused to the coating. The result is reported from 0 to 5, wherein 0 means there is no changed observed and means the coating is completely destroyed.

Reactor

Under a continuous flow of argon, the reactions were performed in a 500 ml or 1000 mL three-neck round-bottom flask. A syringe pump (KD Scientific Inc.) was connected to the flask to add the diisocyanate compound to the catalyst dissolved in the diepoxide compound.

Example 1

Synthesis of epoxy-terminated polyoxazolidinone-based prepolymers with Araldite® DY/D-CH and with MDI 1806 using LiCl according to the batch protocol with a molar ratio of epoxy groups to isocyanate groups of 2.5:1.

A reactor as previously described was charged with LiCl (504 mg, 11.9 mmol), MDI 1806 (141 g, 1.13 mol isocyanate groups) and Araldite® DY/D-CH (344 g, 2.82 mol epoxy groups). The reactor was closed and inertized with argon. The mixture was stirred (400 rpm) and heated to 175° C. After 3.5 h, the reaction mixture was allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 cm 1.

The following analytical data were obtained:

EEW: 369 g/eq

Oxazolidinone content: 20.0 wt %

Number average molecular weight: 697 $g \cdot mol^{-1}$

Polydispersity Index: 2.9

Color index: 7 on the Gardner scale

Viscosity: 120000 mPa·s

Example 2

Synthesis of epoxy-terminated polyoxazolidinone-based prepolymers with Araldite® DY/D-CH, ipox RD 20 in a 1:1 (wt/wt) ratio and with MDI 1806 using LiBr and DMPU according to the semi-batch protocol with a molar ratio of epoxy groups to isocyanate groups of 2.5:1.

A reactor as previously described was charged with a mixture of Araldite® DY/D-CH (190 g, 1.56 mol epoxy groups) and ipox RD 20 (190 g, 1.27 mol epoxy groups). The reactor was closed and inertized with argon. The mixture was stirred (400 rpm) and heated to 175° C. A solution of LiBr (25 mg, 0.29 mmol) in 10 mL DMPU was added in one portion. After 10 minutes at this temperature, MDI 1806 (141 g, 1.13 mol isocyanate groups) was added at a rate of 1.6 mL/min. After the end of the addition the mixture was stirred 3 h at 175° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 303 g/eq

Number average molecular weight: 903 $g \cdot mol^{-1}$

Polydispersity Index: 3.8

Color index: 4.8 on the Gardner scale

Viscosity: 594000 mPa·s

Example 3

Synthesis of epoxy-terminated polyoxazolidinone-based prepolymers with Araldite® DY/D-CH, ipox RD 20 in a 2:1 (wt/wt) ratio and with MDI 1806 using LiBr and DMPU according to the semi-batch protocol with a molar ratio of epoxy groups to isocyanate groups of 2.5:1.

A reactor as previously described was charged with a mixture of Araldite® DY/D-CH (250 g, 2.05 mol epoxy groups) and ipox RD 20 (125 g, 0.83 mol epoxy groups). The reactor was closed and inertized with argon. The mixture was stirred (400 rpm) and heated to 175° C. A solution of LiBr (25 mg, 0.29 mmol) in 8.3 mL DMPU was added in one portion. After 10 minutes at this temperature, MDI 1806 (144 g, 1.15 mol isocyanate groups) was added at a rate of 1.8 mL/min. After the end of the addition the mixture was stirred 3 h at 175° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 298 g/eq

Number average molecular weight: 794 $g \cdot mol^{-1}$

Polydispersity Index: 3.4

Color index: 7.6 on the Gardner scale

Viscosity: 202000 mPa·s

Example 4

Synthesis of epoxy-terminated polyoxazolidinone-based prepolymers with Araldite® DY/D-CH, ipox RD 20 in a 1:2 (wt/wt) ratio and with MDI 1806 using LiBr and DMPU according to the semi-batch protocol with a molar ratio of epoxy groups to isocyanate groups of 2.5:1.

A reactor as previously described was charged with a mixture of Araldite® DY/D-CH (125 g, 1.02 mol epoxy groups) and ipox RD 20 (250 g, 1.67 mol epoxy groups). The reactor was closed and inertized with argon. The mixture was stirred (400 rpm) and heated to 175° C. A solution of LiBr (23 mg, 0.26 mmol) in 7.8 mL DMPU was added in one portion. After 10 minutes at this temperature, MDI 1806 (135 g, 1.08 mol isocyanate groups) was added at a rate of 1.8 mL/min. After the end of the addition the mixture was stirred 3 h at 175° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 308 g/eq

Number average molecular weight: 955 $g \cdot mol^{-1}$

Polydispersity Index: 3.6

Color index: 6 on the Gardner scale

Viscosity: 1080000 mPa·s

Example 5

Synthesis of epoxy-terminated polyoxazolidinone-based prepolymers with Araldite® DY/D-CH with pMDI using LiBr and DMPU according to the semi-batch protocol with a molar ratio of epoxy groups to isocyanate groups of 2.5:1.

A reactor as previously described was charged with Araldite® DY/D-CH (350 g, 2.87 mol epoxy groups). The reactor was closed and inertized with argon. The mixture was stirred (400 rpm) and heated to 185° C. A solution of LiBr (25 mg, 0.29 mmol) in 8.3 mL DMPU was added in one portion. After 10 minutes at this temperature, pMDI (152 g, 1.15 mol isocyanate groups) was added at a rate of 1.5 mL/min. After the end of the addition the mixture was stirred 2 h at 180° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 330 g/eq

Number average molecular weight: 817 $g \cdot mol^{-1}$

Polydispersity Index: 8.9

Color index: 8.1 on the Gardner scale

Viscosity: 513000 mPa·s

Example 6

Synthesis of epoxy-terminated polyoxazolidinone-based prepolymers with Araldite® DY/D-CH, ipox RD 20 in a 1:1 (wt/wt) ratio and with MDI and pMDI in a 1:1 ratio (wt/wt) using LiBr and CPC according to the semi-batch protocol with a molar ratio of epoxy groups to isocyanate groups of 2.5:1.

A reactor as previously described was charged with Araldite® DY/D-CH (75 g, 614.8 mmol epoxy groups). The reactor was closed and inertized with argon. The mixture was stirred (400 rpm) and heated to 185° C. A solution of LiBr (9.6 mg, 0.11 mmol) in 34.9 mL CPC was added in one portion. ipox RD20 (75 g, 500 mmol epoxy groups) was added to the mixture. After 10 minutes at this temperature, a mixture of MDI (29.45 g, 223 mmol isocyanate groups) and pMDI (27.9 g, 223 mmol isocyanate groups) was added at a rate of 1.2 mL/min. After the end of the addition the mixture was stirred 1 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 362 g/eq

Number average molecular weight: 904 $g \cdot mol^{-1}$

Polydispersity Index: 9.5

Color index: 6.3 on the Gardner scale

Viscosity: 88700 mPa·s

Example 7

Synthesis of epoxy-terminated polyoxazolidinone-based prepolymers with Araldite® DY/D-CH, ipox RD 20 in a 1:1 (wt/wt) ratio with MDI using LiBr and CPC according to the semi-batch protocol with a molar ratio of epoxy groups to isocyanate groups of 2.5:1.

A reactor as previously described was charged with Araldite® DY/D-CH (95 g, 778.7 mmol epoxy groups). The reactor was closed and inertized with argon. The mixture was stirred (400 rpm) and heated to 185° C. A solution of LiBr (12 mg, 0.14 mmol) in 3.4 mL CPC was added in one portion. ipox RD20 (95 g, 633.3 mmol epoxy groups) was added to the mixture. After 10 minutes at this temperature, MDI (70.72 g, 564.8 mmol isocyanate groups) was added at a rate of 1.2 mL/min. After the end of the addition the mixture was stirred 1 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 292 g/eq

Number average molecular weight: 838 $g \cdot mol^{-1}$

Polydispersity Index: 5.3

Color index: 7.1 on the Gardner scale

Viscosity: 714000 mPa·s

Example 8

Synthesis of epoxy-terminated polyoxazolidinone-based prepolymers with Araldite® DY/D-CH, ipox RD 20 in a 2:1 (wt/wt) ratio with pMDI using LiBr and CPC according to the semi-batch protocol with a molar ratio of epoxy groups to isocyanate groups of 2.5:1.

A reactor as previously described was charged with Araldite® DY/D-CH (100 g, 819.7 mmol epoxy groups). The reactor was closed and inertized with argon. The mixture was stirred (400 rpm) and heated to 185° C. A solution of LiBr (10.4 mg, 0.12 mmol) in 52 mL CPC was added in one portion. ipox RD20 (50 g, 333.3 mmol) was added to the mixture. After 10 minutes at this temperature, pMDI (61 g, 461.2 mmol isocyanate groups) was added at a rate of 1.2 mL/min. After the end of the addition the mixture was stirred 1 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 379 g/eq

Number average molecular weight: 907 $g \cdot mol^{-1}$

Polydispersity Index: 14.5

Color index: 6.1 on the Gardner scale

Viscosity: 28100 mPa·s

Example 9

Synthesis of epoxy-terminated polyoxazolidinone-based prepolymers with Araldite® DY/D-CH, ipox RD 20 in a 1:1 (wt/wt) ratio and MDI and pMDI using LiBr and CPC according to the semi-batch protocol with a molar ratio of epoxy groups to isocyanate groups of 2.5:1.

A reactor as previously described was charged with Araldite® DY/D-CH (75 g, 614.8 mmol epoxy groups). The reactor was closed and inertized with argon. The mixture was stirred (400 rpm) and heated to 185° C. A solution of LiBr (9.5 mg, 0.11 mmol) in 34.9 mL CPC was added in one portion. ipox RD20 (75 g, 500 mmol) was added to the mixture. After 10 minutes at this temperature, a mixture of MDI (37.19 g 297.3 mmol isocyanate groups) and pMDI (19.63 g, 148.6 mmol isocyanate groups) was added at a rate of 1.2 mL/min. After the end of the addition the mixture was stirred 3.5 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 286 g/eq

Number average molecular weight: 871 $g \cdot mol^{-1}$

Polydispersity Index: 8.0

Color index: 8.3 on the Gardner scale

Viscosity: 48500 mPa·s

Example 10

Synthesis of epoxy-terminated polyoxazolidinone-based prepolymers with Araldite® DY/D-CH, ipox RD 20 in a 1:1 (wt/wt) ratio and MDI and pMDI using LiBr and CPC according to the semi-batch protocol with a molar ratio of epoxy groups to isocyanate groups of 2.5:1.

A reactor as previously described was charged with Araldite® DY/D-CH (150 g, 1.23 mol epoxy groups). The reactor was closed and inertized with argon. The mixture was stirred (400 rpm) and heated to 185° C. A solution of LiBr (18 mg, 0.22 mmol) in 6.9 mL CPC was added in one portion. ipox RD20 (150 g, 1.00 mol) was added to the mixture. After 10 minutes at this temperature, a mixture of MDI (74.38 g, 594.4 mmol isocyanate groups) and pMDI (39.26 g, 297.3 mmol isocyanate groups) was added at a rate of 1.2 mL/min. After the end of the addition the mixture was stirred 3.5 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The following analytical data were obtained:

EEW: 379 g/eq

Number average molecular weight: 875 $g \cdot mol^{-1}$

Polydispersity Index: 7.6

Color index: 5.2 on the Gardner scale

Viscosity: could not be detected, viscosity of sample too high

Example 11

Synthesis of epoxy-terminated polyoxazolidinone-based prepolymers with Araldite DY/D-CH, ipox RD 20 in a 1:1 (wt/wt) ratio and MDI and pMDI using Ph4PCl according to the semi-batch protocol with a molar ratio of epoxy groups to isocyanate groups of 2.5:1.

A reactor as previously described was charged with Araldite DY/D-CH (150 g, 1.23 mol epoxy groups). The reactor was closed an inertized with argon. The mixture was stirred (400 rpm) and heated to 185° C. $Ph_4PCl$ (83 mg, 0.22 mmol) was added in one portion. ipox RD20 (150 g, 1.00 mol) was added to the mixture. After 10 minutes at this temperature, a mixture of MDI (74.38 g, 594.4 mmol isocyanate groups) and pMDI (39.26 g, 297.3 mmol isocyanate groups) was added at a rate of 1.2 mL/min. After the end of the addition the mixture was stirred 3.5 h at 185° C. and subsequently allowed to cool to room temperature. The completion of the reaction was confirmed by the absence of the isocyanate band (2260 $cm^{-1}$) in the IR spectrum from the reaction mixture. In the IR spectrum the characteristic signal for the oxazolidinone carbonyl group was observed at 1749 $cm^{-1}$.

The EEW was determined to be 276 g/eq.

Oxazolidinone content: 18.5 wt %

The analysis of the molecular weight with GPC showed a number average molecular weight of 875 $g \cdot mol^{-1}$ and a Polydispersity Index of 7.6.

The color index was determined to be 5.6 on the Gardner scale.

Viscosity: could not be detected, viscosity of sample too high

Comparative Example 12: BDDE+Aradur 949-2 (70:30)

14.0 g of BDDE is added to 10.9 g of Aradur 949-2 and 1.6 g of a 10% by weight phosphorus acid solution (diluted in 1-methoxy-2-propanol). This corresponds to a mixing ratio of 70:30 BDDE to Aradur 949-2, solid to solid. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Comparative Example 13: TMPGE+Aradur 949-2 (70:30)

14.0 g of TMPGE is added to 10.9 g of Aradur 949-2 and 1.6 g of a 10% by weight phosphorus acid solution (diluted in 1-methoxy-2-propanol). This corresponds to a mixing ratio of 70:30 TMPGE to Aradur 949-2, solid to solid. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Comparative Example 14: Araldite® GT 6009N+Aradur 949-2 (80:20)

8 g of Araldite® GT 6009 N are mixed with a solvent solution of 5.1 g of MPA, 5.1 of toluene and 0.40 g of Butanol. This is added to 3.6 g Aradur 949-2 and 0.8 g of a 10% by weight phosphorus acid solution (diluted in 1-methoxy-2-propanol). This corresponds to a mixing ratio of 80:20 Araldite® GT 6009N to Aradur 949-2, solid to solid. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Comparative Example 15: Araldite® GT 6009N+Aradur 949-2 (75:25)

7.5 g of Araldite® GT 6009 N are mixed with a solvent solution of 4.9 g of MPA, 4.9 of Toluol and 0.40 g of Butanol. This is added to 4.5 g Aradur 949-2 and 0.8 g of a 10% by weight phosphorus acid solution (diluted in 1-methoxy-2-propanol). This corresponds to a mixing ratio of 75:25 Araldite® GT 6009N to Aradur 949-2, solid to solid. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Comparative Example 16: Araldite® GT 6009 N+Aradur 3380-1CH (85:15)

The Araldite® GT 6009 N is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven. The resulting solution is stable for several months to use. 17 g of the 50% by weight solution of Araldite® GT 6009 N are added to 3 g of Aradur 949-2 and 0.8 g of a 10% by weight phosphorus acid solution (diluted in 1-methoxy-2-propanol). This corresponds to a mixing ratio of 85:15 Araldite® GT 6009N to Aradur 3380-1 CH, solid to solid. In addition, 5 g of a solvent solution of MPA:Toluol:Butanol 1:1:1 is added. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Comparative Example 17: Araldite® GT 6009 N+Aradur 3380-1CH (85:15)

The Araldite® GT 6009 N is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven. The resulting solution is stable for several months to use. 17 g of the 50% by weight solution of Araldite® GT 6009 N are added to 3 g of Aradur 949-2 and 0.8 g of a 10% by weight phosphorus acid solution (diluted in 1-methoxy-2-propanol). This corresponds to a mixing ratio of 85:15 Araldite® GT 6009N to Aradur 3380-1 CH, solid to solid. In addition, 5 g of a solvent solution of MPA:Toluol:Butanol 1:1:5 is added. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Example 18: Crosslinking of Product of Example 1

The product of example 1 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 13 g of the 50% GLM 123 solution was added to 6.37 g of Aradur 949-2 and 0.8 g of a 10% phosphorus acid solution (diluted in 1-methoxy-2-propanol). This corresponds to a mixing ratio of 65:35 GLM 123 to Aradur 949-2, solid to solid. The concentration of catalyst is 0.8% on solid content. The resulting solution is yellow-brown and slightly cloudy, the potlife is well above 24 h. The oxazolidinone content is 12.4 wt %

Example 19: Product of Example 3+Aradur 949-2 (70:30)

The product of example 3 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven. The resulting solution is stable for several months to use. 14.0 g of this solution is added to 5.5 g Aradur 949-2 and 0.8 g of a 10% by weight phosphorus acid solution (diluted in 1-methoxy-2-propanol). This corresponds to a mixing ratio of 70:30 product of example 3 to Aradur 949-2, solid to solid. The concentration of catalyst used is 0.8% by weight on solid content. The formulation is mixed for 30 seconds at 2850 rpm in the speed mixer. The resulting solution is yellowish-green and slightly cloudy, the potlife was well over 24 h.

Example 20: Product of Example 2+Aradur 949-2 (70:30)

The product of example 2 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 14.0 g of this solution was added to 5.5 g Aradur 949-2 and 0.8 g of a 10% by weight phosphorus acid solution (diluted in 1-methoxy-2-propanol). This corresponds to a mixing ratio of 70:30 product of example 2 to Aradur 949-2, solid to solid. The concentration of catalyst is 0.8% by weight on solid. The formulation is mixed for 30 seconds at 2850 rpm in the speed mixer. The resulting solution is yellow-brown and slightly cloudy, the potlife is well above 24 h.

Example 21: Product of Example 4+Aradur 949-2 (70:30)

The product of example 4 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 14.0 g of this solution was added to 5.5 g Aradur 949-2 and 0.8 g of a 10% by weight phosphorus acid solution (diluted in 1-methoxy-2-propanol). This corresponds to a mixing ratio of 70:30 product of example 4 to Aradur 949-2, solid to solid. The concentration of catalyst is 0.8% by weight on solid. The formulation is mixed for 30 seconds at 2850 rpm in the speed mixer. The resulting solution is yellow-brown and slightly cloudy, the potlife is well above 24 h.

Example 22: Product of Example 2 (BDDE:TMPGE 1:1 in the Polymer and MDI)+Aradur 3380-1CH (85:15)

The product of example 2 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of this solution was added to 3 g Aradur 3380-1 CH and 0.8 g of a 10% by weight phosphorus acid solution (diluted in 1-methoxy-2-propanol). 1.67 g of n-Butanol were added as well. This corresponds to a mixing ratio of 85:15 product of example 2 to Aradur 3380-1 CH, solid to solid. The concentration of catalyst is 0.8% by weight on solid. The formulation is mixed for 30 seconds at 2850 rpm in the speed mixer. The resulting solution is yellow-brown and slightly cloudy, the potlife is well above 24 h.

Example 23: Product of Example 8+Aradur 3380-1CH (85:15)

The product of example 8 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of this solution was added to 3 g Aradur 3380-1 CH and 0.8 g of a 10% by weight phosphorus acid solution (diluted in 1-methoxy-2-propanol). 1.67 g of n-Butanol were added as well. This corresponds to a mixing ratio of 85:15 product of example 8 to Aradur 3380-1 CH, solid to solid. The concentration of catalyst is 0.8% by weight on solid. The formulation is mixed for 30 seconds at 2850 rpm in the speed mixer. The resulting solution is yellow-brown and slightly cloudy, the potlife is well above 24 h.

Example 24: Product of Example 8+Aradur 3380-1CH (85:15)

The product of example 8 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of this solution was added to 3 g Aradur 3380-1 CH. 1.67 g of n-Butanol were added as well. This corresponds to a mixing ratio of 85:15 product of example 8 to Aradur 3380-1 CH, solid to solid. The formulation is mixed for 30 seconds at 2850 rpm in the speed mixer. The resulting solution is yellow-brown and slightly cloudy, the potlife is well above 24 h.

Example 25: Product of Example 9+Aradur 3380-1CH (85:15)

The product of example 9 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of the 50% by weight solution of the product of example 9 was added to 3 g Aradur 3380-1 CH. 1.67 g of n-Butanol were added as well. This corresponds to a mixing ratio of the product of example 9 85:15 to Aradur 3380-1 CH, solid to solid. The formulation is mixed for 30 seconds at 2850 rpm in the speed mixer. The resulting solution is yellow-brown and slightly cloudy, the potlife is well above 24 h.

Example 26: Product of Example 10+Aradur 3380-1CH (85:15)

The product of example 10 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of the 50% by weight solution of the product of example 10 was added to 3 g Aradur 3380-1 CH. 1.67 g of n-Butanol were added as well. This corresponds to a mixing ratio of the product of example 10 85:15 to Aradur 3380-1 CH, solid to solid. The formulation is mixed for 30 seconds at 2850 rpm in the speed mixer. The resulting solution is yellow-brown and slightly cloudy, the potlife is well above 24 h.

Example 27: Product of Example 11+Aradur 3380-1CH (85:15)

The product of example 11 is added to a glass bottle and diluted with the same amount of a solvent mixture consisting of 12 parts by weight methoxypropyl acetate, 12 parts by weight toluene and 1 part by weight n-butanol. The glass bottle is closed and stored at 50° C. in an oven for 16 hours. The resulting solution is stable for several months. 17 g of the 50% by weight solution of the product of example 11 solution was added to 3 g Aradur 3380-1 CH. 1.67 g of n-Butanol were added as well. This corresponds to a mixing ratio of the product of example 1185:15 to Aradur 3380-1 CH, solid to solid. The formulation is mixed for 30 seconds at 2850 rpm in the speed mixer. The resulting solution is yellow-brown and slightly cloudy, the potlife is well above 24 h. The oxazolidinone content is 13.5 wt %

Application

The formulations were applied on tin white coated plates E1 with dimensions of 250×200×0.24 $mm^3$. The white coated plates are thoroughly cleaned and degreased before coating, e.g. with ethyl acetate or acetone. A 0.7-meter spiral applicator (equivalent to 42 μm wet) is used to apply the coating. With this spiral applicator the white plates are coated as completely as possible. After application and approximately 5 minutes ventilation time, the coatings are cured in the air oven for 12 to 20 min at 200° C., depending on the crosslinker used. The dry layer thickness after curing should be 10 μm.

TABLE 1

| Test Results | | | | | | | | |
|---|---|---|---|---|---|---|---|---|
| Example No. | CE 13 | CE 12 | CE 14 | CE 15 | CE 16 | CE 17 | 18 | 19 |
| Curing conditions [min, ° C.] | 20,200 | 20,200 | 20,200 | 20,200 | 12,200 | 12,200 | 20,200 | 20,200 |
| Hardness [sec] | 189 | 224 | 237 | 235 | 219 | 228 | 226 | 206 |
| Solvent resistance | 3334 | 0001 | 0001 | 0001 | 1233 | 1123 | 0003 | 0001 |
| Chemical resistance | | | | | | | | |
| De-ionized water | 0 | 0 | 0 | 0 | 0 | 0 | 0 | 0 |
| 10% by weight NaOH | 4 | 0 | 0 | 0 | 0 | 0 | 4 | 4 |
| 10% by weight H2SO4 | 4 | 5 | 0 | 0 | 0 | 0 | 0 | 0 |
| Stacking strength | 2 | 0 | 0 | 0 | 0 | 0 | 0 | 0 |
| Adhesion Gitterschnitt | 0-1 | 5 | 5 | 5 | 1 | 0-1 | 1 | 1 |
| MEK | 90 | >100 | >500 | >100 | >100 | >100 | >100 | 90 |
| Sterilization test | Partly blisters | Completely peeled off | unchanged | unchanged | unchanged | unchanged | unchanged | unchanged |
| Wedge-bend test | 4.0/4.2/4.4 | Completely peeled off three times | 4.4/3.9/3.9 | 5.9/6.4/4.5 | 2.0/2.0/2.2 | 1.9/1.8/1.9 | >8.5/4.7/5.0 | 6.0/5.2/6.0 |

CE Comparative

TABLE 2

| Test Results | | | | | | | | |
|---|---|---|---|---|---|---|---|---|
| Example No | 20 | 21 | 22 | 23 | 24 | 25 | 26 | 27 |
| Curing conditions [min, ° C.] | 20,200 | 20,200 | 12,200 | 12,200 | 12,200 | 20,200 | 20,200 | 20,200 |
| Hardness [sec] | 197 | 226 | 220 | 205 | 209 | 214 | 216 | 218 |
| Solvent resistance | 0001 | 0002 | 0001 | 0004 | 0004 | 0003 | 0001 | 0001 |
| Chemical resistance | | | | | | | | |
| De-ionized water | 0 | 0 | 0 | 0 | 1 | 0 | 0 | 0 |
| 10% by weight NaOH | 1 | 0-1 | 5 | 3-4 | 5 | 2 | 1 | 1-2 |
| 10% by weight H2SO4 | 0 | 0 | 1 | 1 | 2 | 0 | 0 | 0 |
| Stacking strength | 0 | 0 | 2 | 2 | 2 | 2 | 1-2 | 2 |
| Adhesion Gitterschnitt | 5 | 3-4 | 2-3 | 2-3 | 4 | 2 | 4 | 2 |

TABLE 2-continued

| Test Results | | | | | | | | |
|---|---|---|---|---|---|---|---|---|
| Example No | 20 | 21 | 22 | 23 | 24 | 25 | 26 | 27 |
| MEK Sterilization test | >100 unchanged | >100 unchanged | >100 unchanged | >100 unchanged | >100 unchanged | >100 unchanged | >100 unchanged | >100 unchanged |
| Wedge-bend test | Completely/ 5.4/6.0 | Completely peeled off three times | 2.2/2.2/2.0 | 2.6/2.5/2.7 | 2.5/3.0/3.9 | 2.5/1.9/2.6 | 2.7/2.7/3.2 | 3.1/3.2/2.7 |

CE Comparative

Comparative Example 28

Synthesis of epoxy-terminated polyoxazolidinone-based prepolymers with Araldite DY/D-CH and with MDI 1806 using LiCl according to the batch protocol with molar ratio of epoxy groups to isocyanate groups of 2:1.

A reactor as previously described (see the section before "Example 1") was charged with LiCl (0.052 g, 1.23 mmol), MDI 1806 (22.0 g, 88 mmol) and Araldite DY-D/CH (35.6 g, 176 mmol). The reactor was closed and inertized with argon. The mixture was stirred (400 rpm) and heated to 175° C. After 10 minutes, the reaction was stopped due to solidification of the reaction mixture.

In the IR spectrum the characteristic signal for the oxazolidinone carbonyl group was observed at 1749 $cm^{-1}$, along with a lot of other peaks indicating side products The determination of the EEW was not possible.

The analysis of the molecular weight with GPC was not possible.

The color index was determined to be >18 and consequently out of the range of the Gardner scale.

The invention claimed is:

1. A composition at least comprising:

(A) at least one epoxy-group terminated polyoxazolidinone, derived from at least one polyisocyanate compound and at least one aliphatic polyepoxide compound, wherein the epoxy-group terminated polyoxazolidinone in general has an oxazolidinone weight content of 5 to 50% by weight, (B) at least one compound having at least one group that is reactive towards terminal epoxy-groups, and (C) at least one solvent, wherein the at least one solvent is at least one organic solvent selected from the group consisting of aromatic hydrocarbons, ketones, alcohols, ether alcohols and their acetate esters, cyclic ethers, ureas and mixtures thereof, wherein a molar ratio of epoxy groups of the polyepoxide compound to isocyanate groups of the polyisocyanate compound is 50:1 to 2.4:1, wherein the at least one epoxy-group terminated polyoxazolidinone is present in an amount of 50 to 95% by weight, in respect of the solid content of the composition, and wherein the solid content of the composition is at least 35% by weight.

2. The composition according to claim 1, wherein the molar ratio of the epoxy groups of the polyepoxide compound to the isocyanate groups of the polyisocyanate compound is 50:1 to 2.5:1.

3. The composition according to claim 1, wherein component (B) is selected from the group consisting of dicyandiamides, substituted guanidines, phenolic compounds, amines, benzoxazines, anhydrides, amido amines, polyamides, polyamines, polyesters, polyisocyanates, polymercaptans, urea formaldehyde, melamine formaldehyde resins and mixtures thereof.

4. The composition according to claim 1, wherein the at least one polyisocyanate compound is at least one aliphatic polyisocyanate compound and/or at least one aromatic polyisocyanate compound.

5. The composition according to claim 1, wherein the at least one epoxy-group terminated polyoxazolidinone (A) has an epoxy equivalent weight (EEW) of from 100 g/eq to 10000 g/eq, wherein the epoxy equivalent weight was determined via titration according to DIN EN 1877-1:2000.

6. The composition according to claim 1, wherein the at least one compound having at least one functional group that is reactive towards terminal epoxy-groups (component (B)) is present in the composition in an amount of 5 to 50% by weight in respect of the solid content of the composition and wherein at least one solvent (component (C)) is present in the composition in an amount of 5 to 75% by weight, in respect of the sum of components (A), (B) and (C) of the composition.

7. A process for the preparation of the composition according to claim 1 comprising at least a step of mixing components (A), (B) and (C).

8. A coating formulation comprising the composition according to claim 1.

9. A process for coating of a substrate comprising a step of application of the coating formulation according to claim 8 onto the substrate.

10. A coated substrate comprising the coating formulation according to claim 8.

* * * * *